(12) United States Patent
Banerjee et al.

(10) Patent No.: US 10,329,495 B2
(45) Date of Patent: Jun. 25, 2019

(54) PROCESS FOR REMOVING OXYGENATES FROM NAPHTHA

(71) Applicant: UOP LLC, Des Plaines, IL (US)

(72) Inventors: Soumendra Mohan Banerjee, New Delhi (IN); Jayant K. Gorawara, Buffalo Grove, IL (US); Pijus Kanti Roy, New Delhi (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/675,360

(22) Filed: Aug. 11, 2017

(65) Prior Publication Data

US 2018/0119029 A1   May 3, 2018

Related U.S. Application Data

(60) Provisional application No. 62/414,639, filed on Oct. 28, 2016.

(51) Int. Cl.
| | |
|---|---|
| *C10G 25/05* | (2006.01) |
| *B01D 3/14* | (2006.01) |
| *C01B 39/20* | (2006.01) |
| *C01B 39/32* | (2006.01) |
| *C10G 3/00* | (2006.01) |
| *B01J 29/08* | (2006.01) |
| *B01J 29/60* | (2006.01) |
| *C01B 3/12* | (2006.01) |

(52) U.S. Cl.
CPC ............... *C10G 25/05* (2013.01); *B01D 3/14* (2013.01); *C01B 39/20* (2013.01); *C01B 39/32* (2013.01); *C10G 3/00* (2013.01); *B01J 29/08* (2013.01); *B01J 29/60* (2013.01); *C01B 3/12* (2013.01); *C01B 2203/0283* (2013.01); *C10G 2300/202* (2013.01); *C10G 2300/203* (2013.01)

(58) Field of Classification Search
CPC .... C10G 25/05; C10G 3/00; C10G 2300/203; C10G 2300/202; C01B 39/20; C01B 39/32; C01B 3/01; B01D 3/14; B01J 29/08; B01J 29/60
See application file for complete search history.

(56) References Cited

U.S. PATENT DOCUMENTS

| 5,245,107 A | 9/1993 | Yon et al. |
|---|---|---|
| 6,759,563 B1 | 7/2004 | Hibbs |
| 2011/0207836 A1* | 8/2011 | Chen .................... B01D 53/002 518/705 |

(Continued)

OTHER PUBLICATIONS

PCT Search Report for International PCT Application No. PCT/US2017/052493 dated Nov. 16, 2017.

(Continued)

*Primary Examiner* — Randy Boyer
*Assistant Examiner* — Juan C Valencia

(57) ABSTRACT

A process is presented for the removal of contaminants like oxygenates from hydrocarbons. The contaminant oxygenates are removed from hydrocarbons that may be feed to cracking units. A crude feed stream is fed to a water wash column along with water to remove oxygenates and is subsequently treated with an adsorbent to effectively remove all the oxygenates from the crude hydrocarbon. A regenerant medium from a naphtha hydrotreating unit is used to regenerate the adsorbent.

18 Claims, 3 Drawing Sheets

(56) References Cited

U.S. PATENT DOCUMENTS

2013/0180884 A1* 7/2013 Minoux .................. B01J 20/08
                                                        208/57
2013/0267742 A1* 10/2013 Minoux ............... C10G 25/003
                                                        585/16
2014/0357914 A1    12/2014 Funk et al.

OTHER PUBLICATIONS

International Search Report from corresponding PCT application No. PCT/US2017/052493, dated Nov. 16, 2017.
Written Opinion of the International Searching Authority from corresponding PCT application No. PCT/US2017/052493, dated Nov. 16, 2017.

* cited by examiner

PROCESS FOR REMOVING OXYGENATES FROM NAPHTHA

CROSS-REFERENCE TO RELATED APPLICATION

This application claims priority from Provisional Application No. 62/414,639 filed Oct. 28, 2016, the contents of which cited application are hereby incorporated by reference in its entirety.

BACKGROUND

The present subject matter relates generally to methods for the removal of oxygenates from naphtha. More specifically, the present subject matter relates to the methods for the removal of oxygenates from petrochemical naphtha by water wash and subsequent treatment with an adsorbent.

The hydrocarbons used in industry should be produced as pure as possible without the presence of oxygen containing organic compounds such as oxygenates. Oxygenates are compounds with at least one hydrocarbon backbone and a low content of oxygen. Oxygenate compounds are valuable materials, but in combination with hydrocarbons, they are unsuitable for use in various petroleum conversion processes where catalysts are employed. The straight run naphtha from the upstream crude column is usually contaminated due to processing of different crude slates. The contaminants present in the straight run naphtha generally includes oxygenates such as alcohol, ketones, aldehydes and ether that are known to cause problems in a refinery. Oxygenate compounds found in the crude naphtha create problems such as catalyst deactivation or fouling in the downstream processing. The transport of the contaminated material to other tanks has a higher risk of cross contamination for the remaining product storage tanks. Therefore, there is a need to remove the oxygenate contaminants from the straight run naphtha and eliminate the associated problems in downstream processing.

Conventionally, oxygenates in the crude run naphtha are removed by water-wash. However, water washing the straight run naphtha does not remove all of the oxygenates in order to meet the required specification of the petrochemical grade. There is a need for an improved process to remove oxygenates from crude naphtha for commercial use.

Those skilled in the art are well versed in use of adsorbents for removal of oxygenates from the petrochemical naphtha. In typical operation of an adsorptive oxygenate removal unit, the system uses two or more beds wherein one bed is operating in adsorption mode and the other operating in regeneration mode. But the adsorbent beds need to be replaced continuously for efficient removal of oxygenates and that may result in high energy costs. Generally, a liquid regenerant is externally added to the adsorbent column to regenerate the adsorbent bed. This can further result in additional cost for effective operation of the adsorbent bed. Therefore, there is need for an improved and more economical method for removing oxygenates from petrochemical naphtha.

SUMMARY

An embodiment of the subject matter is a process for removing contaminants from hydrocarbon stream comprising splitting a hydrocarbon feed stream into a light hydrocarbon stream and a splitter bottoms hydrocarbon stream. The splitter bottoms hydrocarbon stream is contacted with an adsorbent at first operating conditions to remove a portion of at least one contaminant to produce an effluent stream.

Another embodiment of the subject matter is a process for removing contaminants from hydrocarbon stream comprising splitting a hydrocarbon feed stream into a light hydrocarbon stream and a splitter bottoms hydrocarbon stream. The splitter bottoms hydrocarbon stream is contacted with an adsorbent at first operating conditions to remove a portion of at least one contaminant to produce an effluent stream. A light hydrocarbon stream from overhead of a naphtha splitter is contacted with the adsorbent to regenerate the adsorbent. The hydrocarbon feedstream comprises crude naphtha.

A further embodiment of the subject matter is a process for removing contaminants from hydrocarbon stream comprising splitting a hydrocarbon feed stream into a light hydrocarbon stream and a splitter bottoms hydrocarbon stream. The splitter bottoms hydrocarbon stream is contacted with an adsorbent at first operating conditions to remove a portion of at least one contaminant to produce an effluent stream. A syn gas stream is contacted with the adsorbent to regenerate the adsorbent.

The present subject matter seeks to provide a process to remove contaminants like oxygenates from crude naphtha by water wash and use of an adsorbent. A benefit of the subject matter is that the combination of water wash along with naphtha splitter reduces the volume of the adsorbent to be used. These and other features, aspects, and advantages of the present invention will become better understood upon consideration of the following detailed description, drawings and appended claims.

DETAILED DESCRIPTION

Naphtha from the crude distillation section is fed to cracking units for further processing. The presence of oxygenates in an amount more than 50 wppm have adverse impact on the equipment and catalyst used in the cracking units. The processing of the different type of crudes in the refinery leads to contamination of the crude with oxygenates. The naphtha feedstock to a cracking unit is often contaminated with oxygenates like MTBE, TAME, methanol, ketones etc. Oxygenates can be a potential source of elemental oxygen that can contribute to formation of NOx in the cracker cold box. Trace levels on NOx in the presence of Butadiene can form an explosive mixture that can blow off cold boxes. Therefore, it is important to remove these oxygenates from the crude naphtha before any downstream processing.

Typically, oxygenates are removed from the petrochemical naphtha by water wash. However, some amount of oxygenates remain in the crude naphtha even after water washing making it unsuitable for downstream processing. A conventional method to remove oxygenates from the petrochemical naphtha is by passing the naphtha to adsorbent beds. But the adsorbent beds need to be regenerated continuously for efficient removal of oxygenates and that may result in high energy costs and therefore is uneconomical.

The present subject matter provides a cost effective method to remove oxygenates from petrochemical naphtha. The benefit of the present subject matter is that it reduces the size of the adsorber and the amount of adsorbent being used to remove oxygenates from the crude naphtha. A key advantage of the present subject matter is use of a splitter upstream of the adsorbent bed that allows improvement in the process economics. An additional benefit of the present subject matter is use of slip stream from stripper or a stripper overhead to regenerate the adsorbent bed that further improves the process economics.

Figure 1:
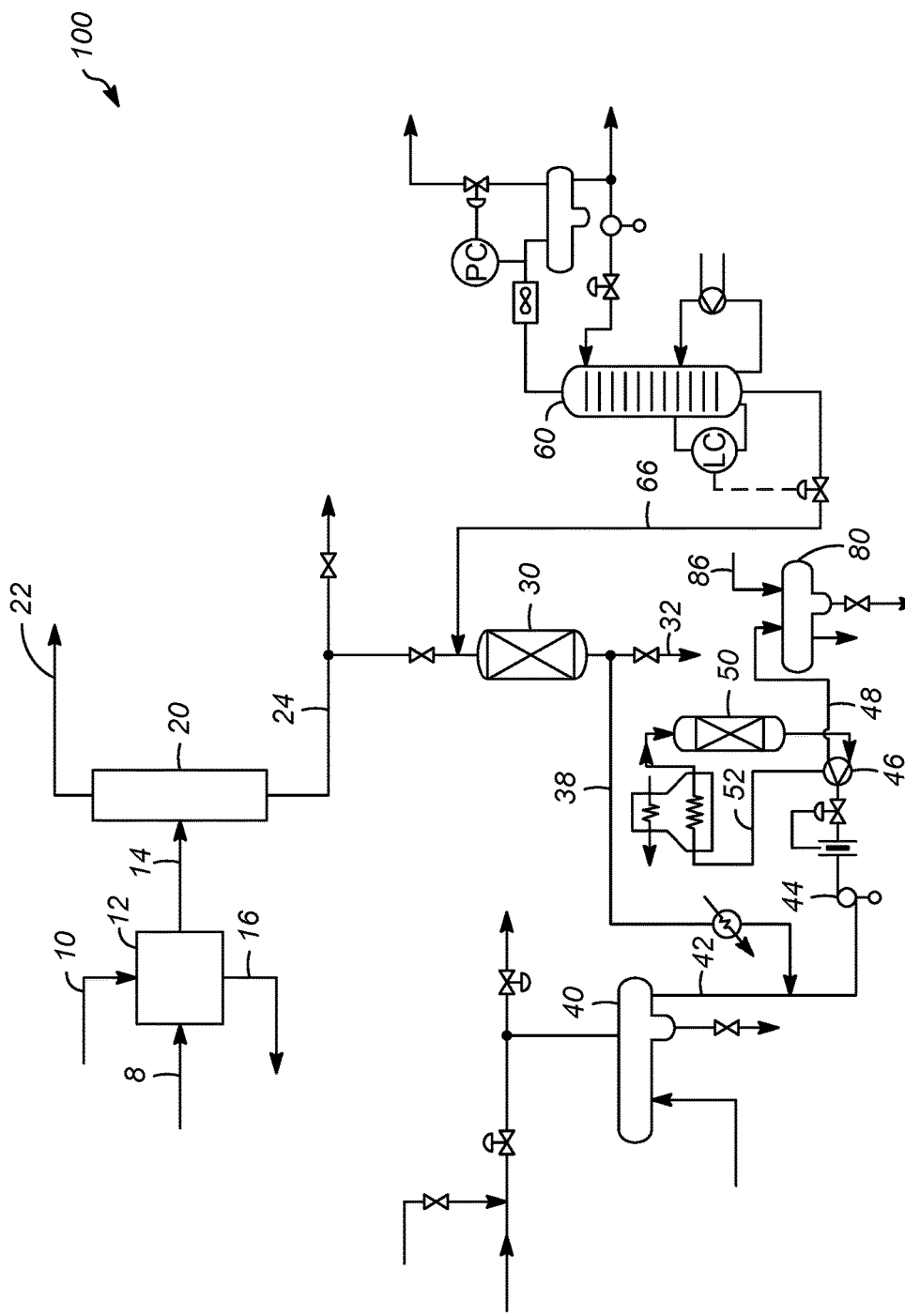
FIG. 1 is a flow scheme for the process of the present subject matter.

A general understanding of the process for removal of oxygenates from naphtha can be obtained by reference to FIG. 1. FIG. 1 has been simplified by the deletion of a large number of apparatuses customarily employed in a process of this nature, such as vessel internals, temperature and pressure controls systems, flow control valves, recycle pumps, etc. which are not specifically required to illustrate the performance of the subject matter. Furthermore, the illustration of the process of this subject matter in the embodiment of a specific drawing is not intended to limit the subject matter to specific embodiments set out herein.

The present subject matter, as shown in FIG. 1, includes a reactor system 100 for a process for removal of oxygenates from naphtha. A feed stream in line 8 having a naphtha stream that may be contaminated with oxygenates including ketones, alcohols, ethers, aldehydes and the like, is passed to a water wash tower 12. A cooled boiler feed water stream in line 10 is passed to the water wash column 12 as a washing medium. The water wash tower 12 may include centrifugal devices, mixing valves to ensure intimate contact and good mixing of the feed stream in line 8 and the washing medium in line 10.

An effluent stream comprising washed naphtha stream with reduced oxygenates in removed at top of the wash column in line 14. The washed naphtha stream in line 14 is passed to a splitter column 20. The splitter column 20 is in downstream communication with the water wash tower 12 to split the naphtha stream in line 14. The washed naphtha stream in line 14 has reduced contaminants like hydrogen sulfide, mercaptans or nitriles. The oxygenates from the naphtha feed stream in line 8 are removed into a bleed stream in line 16. The bleed stream in line 16 may be passed to sour water stripper. The washed naphtha stream in line 14 is split in the splitter column 20 to an overhead distillate stream in line 22 that may comprise about 30% of the total naphtha and a bottom stream in line 24 comprising bulk of the oxygenates and other contaminants. The overhead distillate stream if split in a narrow boiling range is expected to be lower in many oxygenate contaminants present in the heavier feed in line 22 may be directly passed to a naphtha cracking unit without any further treatment.

The naphtha stream in line 24 comprising the bulk of oxygenates is passed to an adsorbent column 30. The adsorbent column 30 is in downstream communication with the splitter column 20 for adsorption of the oxygenates from the naphtha. The adsorbent column 30 may include two or more adsorbent beds comprising an adsorbent. Operating conditions for the adsorbent column will include an operating temperature in the range of from about 10° C. to about 100° C., an operating pressure from about 100 kPa to about 1500 kPa (absolute). The preferred operating temperature will be within the range of from about 20° C. to about 50° C., and the preferred operating pressure is about 200 kPa to about 400 kPa. The pressure may be maintained by a pressure control valve downstream of the adsorbent column 30. The operating condition maintains the operation of the adsorbent column 30 in liquid phase.

The adsorbent column 30 includes solid adsorbents that may be selected from a variety of potential adsorbents like silica gel or activated carbons or zeolites or molecular sieve, such as 13X. Hybrid adsorbents such as zeolite/alumina hybrid may be used as an adsorbent. The zeolites that can be used may include faujasites having a silica to alumina molar ratio of from about 2 to about 2.5, such as, for example, 13X molecular sieve, chabazites, clinoptilolites and LTA (4A, 5A) zeolites.

Another type of oxygenate compound removal adsorbent that is effective in the practice of present subject matter is promoted alumina. The promoter is selected from one or more alkali metals or alkaline earth metals. The preferred alkali metals include sodium and potassium and the preferred alkaline earth metals include magnesium and calcium. The naphtha stream contaminated with oxygenates may be purified by a passage through a multi layer adsorbent bed for removal of more than one type of oxygenate contaminant.

The term "adsorption" as used herein encompasses the use of a solid support to remove ions, and molecules from a gas or liquid. The adsorption may be by "physisorption" in which the adsorption involves surface attractions or "chemisorptions" where there are actual chemical changes in the contaminant that is being removed. Either temperature swing adsorption or displacement process may be employed in regeneration of the adsorption process. A combination of the processes may also be used. The adsorbents may be any porous material known to have an application as an adsorbent including materials such as activated carbon, clays, molecular sieves including zeolites and metal organic frameworks (MOFs), metal oxides including silica gel and alumina that are promoted or activated, as well as other porous materials that can be used to remove or separate the contaminants.

"Temperature swing adsorption (TSA)" refers to a process where regeneration of the adsorbent is achieved by an increase in temperature such as by sending a heated gas through the adsorbent bed to remove or desorb the contaminant. The adsorbent is often cooled before resumption of the adsorption of the contaminant.

"Displacement" refers to a process where the regeneration of the adsorbent is achieved by desorbing the contaminant with another liquid that takes its place on the adsorbent.

The petrochemical naphtha removed from the bottom of the adsorbent column 30 in line 32. The petrochemical naphtha in line 32 has less than 20 wppm oxygenates and preferably less than 1 wppm oxygenates. The naphtha in line 32 has very less sulfur and oxygenates content and does not require any further downstream treatment. The petrochemical naphtha in line 32 may be directly sent for cracking and further use.

A slip stream from a naphtha hydrotreating unit stripper 60 in line 66 is passed to the adsorbent column 30. The naphtha hydrotreating unit stripper 60 is in downstream communication with a naphtha hydrotreating unit 50. The naphtha hydrotreating unit 50 is in downstream communication with the adsorbent column 30. The slip stream in line 66 is used to regenerate the adsorbent beds in the adsorbent column 30. The slip stream may be removed from the bottom of the naphtha hydrotreating unit stripper 60. The temperature of the stripper bottoms may be adjusted by heat exchange to desired temperature range required for regeneration of the adsorbent beds. The slip stream absorbs oxygenates and other contaminants from the adsorbent beds and exits the adsorbent column 30 in line 38. The effluent stream in line 38 from the adsorbent column including oxygenates and other contaminants combines with an effluent from the bottom of a feed surge drum 40. The effluent in line 42 from the bottom of the feed surge drum is passed to a combined feed exchanger and charge heater 46 through a charge pump suction 44 of the naphtha hydrotreating unit. The off gases exit from the top of the combined feed exchanger in line 48 and effluent from the bottom of the exchanger 46 in line 52 may be hydrogenated in the naphtha hydrotreating unit 50. The oxygenates present in the effluent stream in line 52 is converted to water and the sulfur compounds are converted to hydrogen sulfide. The water may be separated in a cold separator and is passed to a sour water stripper from its boot.

The removal of oxygenates from naphtha by combination of a water wash and adsorption in the adsorbent column provides an effective removal of oxygenates of about 90% and preferably about 99% of the oxygenates from the crude naphtha. In addition, by combining the adsorbent column with the naphtha hydrotreating unit enables the use of hot stripper bottoms liquid to regenerate the adsorbent beds. The process advantageously eliminates any additional heating of the regenerating liquid as the stripper bottoms is a hot stream. The naphtha hydrotreating unit is used in an effective way to dispose-off the contaminants oxygenates and sulfur compounds that the circulating naphtha stream picks while regenerating the adsorbent beds. The crude naphtha used for further cracking and other commercial uses is free of oxygenates and sulfur compounds and as a result avoids consequent undesirable downstream reactions like fouling or deactivation of catalysts.

Figure 2:
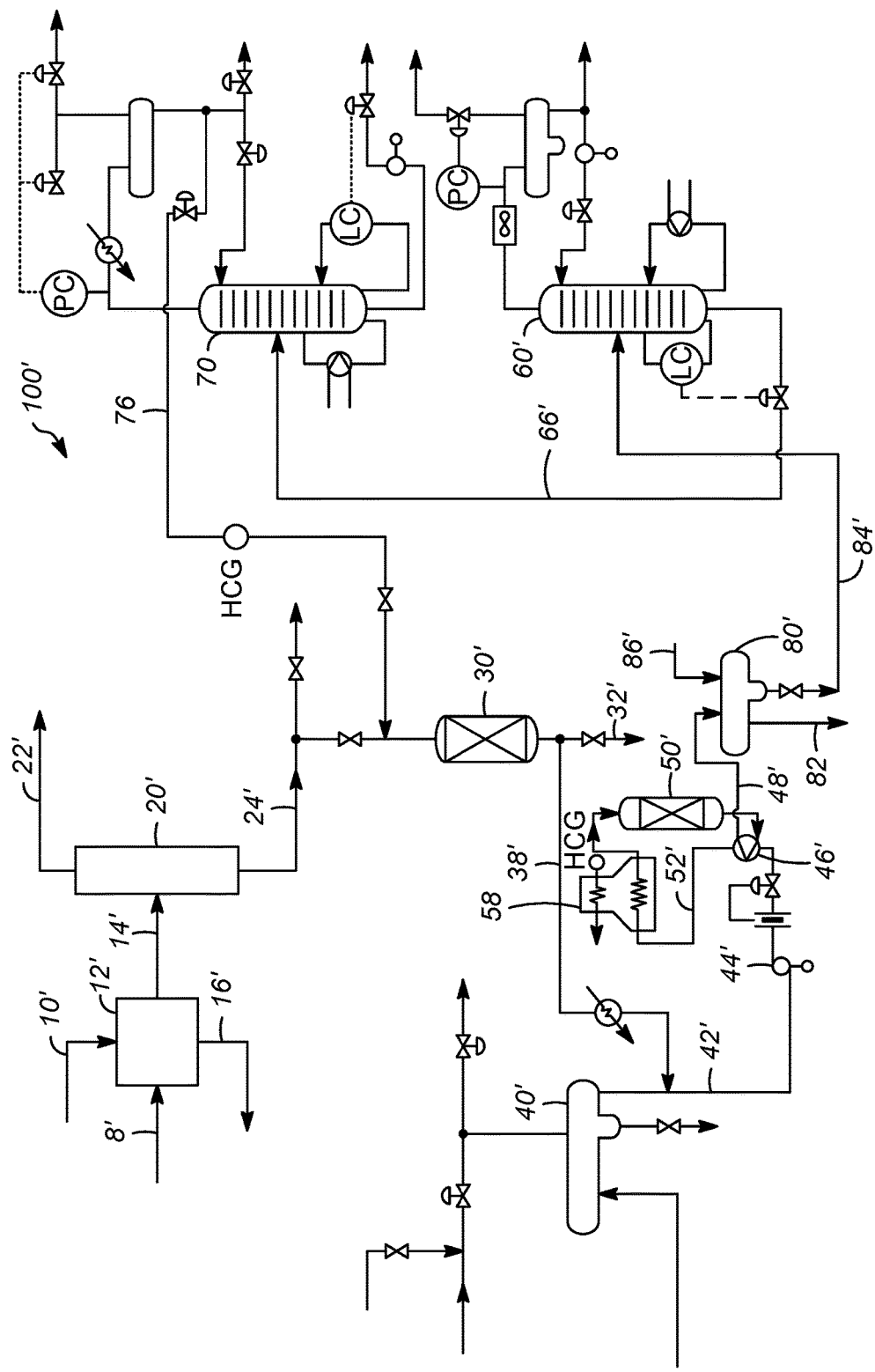
FIG. 2 is alternative embodiment of the process of the present subject matter shown in FIG. 1.

Turning now to FIG. 2, alternative embodiment of the process of the present subject matter shown in FIG. 1 to remove oxygenates from naphtha. The embodiment of FIG. 2 differs from the embodiment of FIG. 1 in that the regenerant liquid to regenerate the adsorbent beds is taken from a naphtha splitter downstream of the naphtha hydrotreating unit stripper. The similar components in FIG. 2 that were described above for FIG. 1 will not be described again for FIG. 2. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol (').

The naphtha stream in line 24' from the bottom of a splitter column 20' comprising the bulk of oxygenates is passed to an adsorbent column 30'. The adsorbent column 30' is in downstream communication with the splitter column 20' for adsorption of the oxygenates from the naphtha. The petrochemical naphtha removed from the bottom of the adsorbent column 30' in line 32'. The petrochemical naphtha in line 32' has less than 20 wppm oxygenates and preferably less than 1 wppm oxygenates. The naphtha in line 32' has very less sulfur and oxygenates content and does not require any further downstream treatment. The petrochemical naphtha in line 32' may be directly sent for cracking and further use.

A naphtha stripper 60' is in downstream communication with a naphtha hydrotreating unit 50'. The naphtha hydrotreating unit 50' is in downstream communication with the adsorbent column 30'. A naphtha splitter 70 is in downstream communication with the naphtha stripper 60'. A naphtha product stream in line 76 from the overhead of the naphtha splitter 70 is heated to a desired temperature of about 180° C. to about 300° C. and preferably to a temperature of about 280° C. to about 290° C. using a heater, electric heater and other heating sources. The naphtha product stream in line 76 is used as a regenerant stream. The regenerant stream in line 76 may also be heated using the convection section of the naphtha hydrotreating unit charge heater 58. The heated regenerant stream in line 76 is passed to the adsorbent column 30' to regenerate the adsorbent beds.

A side draw naphtha product stream (not shown) from the naphtha splitter 70 may be passed to the adsorbent column 30' to regenerate the adsorbent beds. The side draw naphtha product stream from the naphtha splitter 70 may be used as a regenerant stream. The side draw naphtha stream is at a higher temperature than the overhead product of the naphtha splitter. The side draw stream may be pumped and heated in the convection section of the charge heater 58 of the naphtha hydrotreating unit 50' and routed to the adsorbent column 30' for regeneration of the adsorbent beds.

The regenerant stream absorbs oxygenates and other contaminants from the adsorbent beds and exits the adsorbent column 30' in line 38'. The effluent stream in line 38' from the adsorbent column including oxygenates and other contaminants combines with an effluent from the bottom of a feed surge drum 40'. The effluent in line 42' from the bottom of the feed surge drum is passed to a combined feed exchanger and charge heater 46' through a charge pump suction 44' of the naphtha hydrotreating unit. The off gases exit from the top of the combined feed exchanger and effluent from the bottom of the exchanger 46' in line 52' may be hydrogenated in the naphtha hydrotreating unit 50'. The oxygenates present in the effluent stream in line 52' are converted to water and the sulfur compounds are converted to hydrogen sulfide. The water may be separated in a cold separator 80' and is passed to a sour water stripper from its boot in line 82. A make up hydrogen in line 86' may be added to the cold separator. The hydrocarbons comprising $C_7+$ hydrocarbons exit the separator in line 84. The $C_7+$ hydrocarbons in line 84 may be passed to the naphtha stripper 60'. The bottom product of the naphtha stripper comprising $C_7+$ hydrocarbons in line 66' is passed to a naphtha splitter 70.

The removal of oxygenates from naphtha by combination of a water wash and adsorption in adsorbent column provides an effective removal of oxygenates of about 90% and preferably about 99% of the oxygenates from the crude naphtha. The overhead product of the naphtha splitter comprises light hydrocarbons in the range of $C_5$-$C_6$ hydrocarbons. The regeneration of the adsorbent beds using the overhead of the naphtha splitter advantageously eliminates any deposit formation on the adsorbent bed. In addition, heating the overhead product from the naphtha splitter using a convection section of the charge heater of the naphtha hydrotreating unit beneficially enables effective use of the waste heat. The naphtha hydrotreating unit is used in an effective way to dispose-off the contaminants oxygenates and sulfur compounds that the circulating naphtha stream picks while regenerating the adsorbent beds. The crude naphtha used for further cracking and other commercial uses is free of oxygenates and sulfur compounds and as a result avoids consequent undesirable downstream reactions like fouling or deactivation of catalysts.

Figure 3:
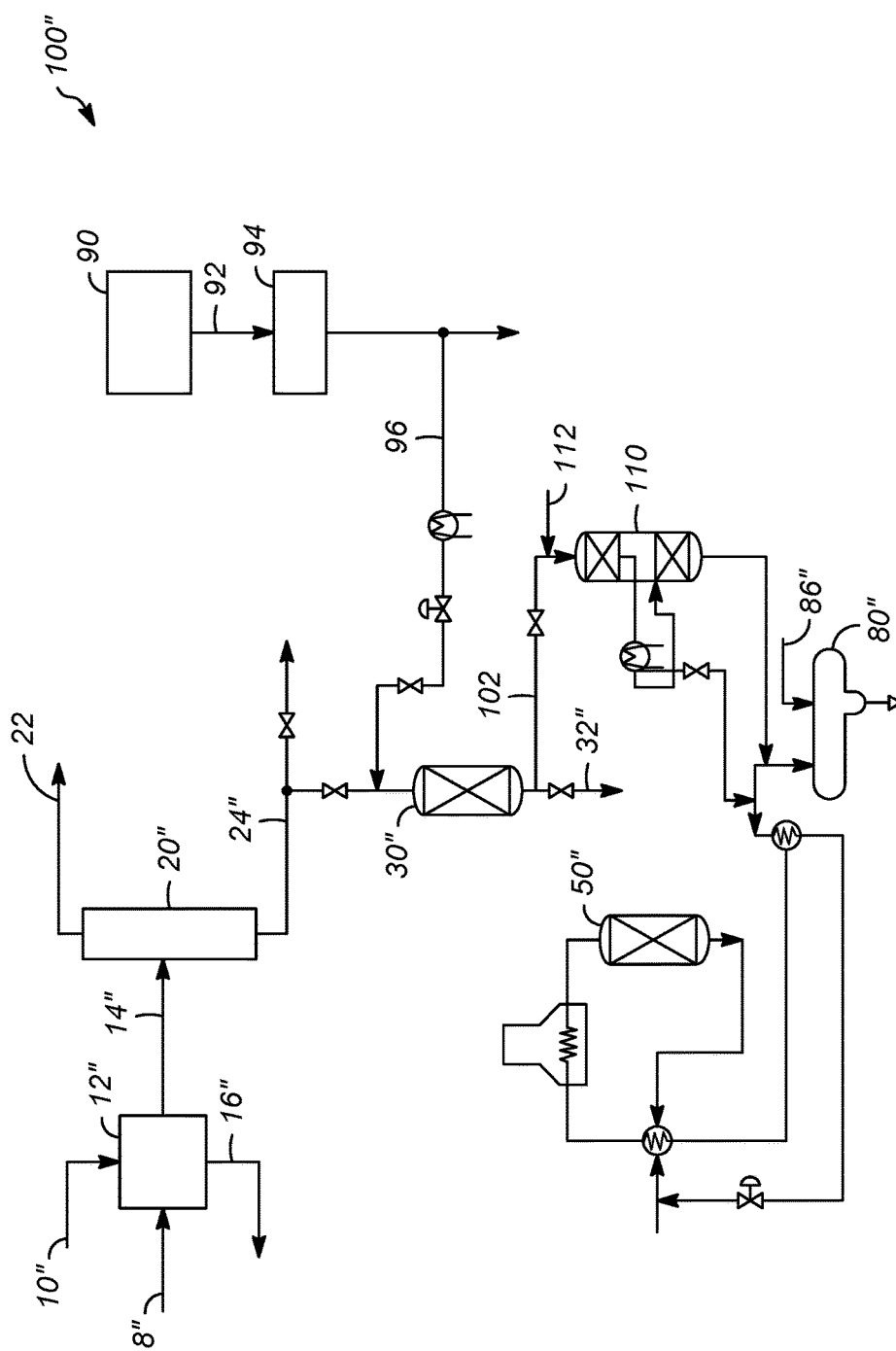
FIG. 3 is another embodiment of the process of the present subject matter.

Turning now to FIG. 3, another embodiment of the process of the present subject matter to remove oxygenates from naphtha. The embodiment of FIG. 3 differs from the embodiment of FIGS. 1 and 2 in that the regenerant liquid to regenerate the adsorbent beds is taken from a syn gas from a coke gasification unit. The similar components in FIG. 3 that were described above for FIGS. 1 and 2 will not be described again for FIG. 3. Many of the elements in FIG. 3 have the same configuration as in FIGS. 1 and 2 and bear the same reference number. Elements in FIG. 3 that correspond to elements in FIG. 2 but have a different configuration bear the same reference numeral as in FIG. 2 but are marked with a prime symbol (").

The naphtha stream in line 24" from the bottom of a splitter column 20" comprising the bulk of oxygenates is passed to an adsorbent column 30". The adsorbent column 30" is in downstream communication with the splitter column 20" for adsorption of the oxygenates from the naphtha. The petrochemical naphtha removed from the bottom of the adsorbent column 30" in line 32". The petrochemical naphtha in line 32" has less than 20 wppm oxygenates and preferably less than 1 wppm oxygenates. The naphtha in line 32" has very less sulfur and oxygenates content and does not require any further downstream treatment. The petrochemical naphtha in line 32" may be directly sent for cracking and further use.

A sweet syn gas in line 96 from the coke gasification unit 90 is passed to the adsorbent column 30" for regeneration of the adsorbent beds in the adsorbent column. The sweet syn gas may be treated in a syn gas treating unit 94 before entering the adsorbent column. The syn gas is maintained at a temperature of about 180° C. to about 280° C. and a pressure of about 4400 kPa to about 4700 kPa. The syn gas in line 96 may be heated to meet the desired temperature for regeneration of the adsorbent beds using a steam or electric heater. The syn gas may be passed to the top or bottom of adsorbent column 30". The syn gas in line 96 is used as a regenerant stream. The regenerant stream absorbs oxygenates and other contaminants from the adsorbent beds and exits the adsorbent column 30" in line 102.

The regenerant stream in line 102 is passed to a shift reactor 110 to convert the carbon mono-oxide (CO) in the syn gas to hydrogen. Steam is added to the top of shift reactor 110 in line 112. The CO present in the syn gas by shift reaction with steam is converted to hydrogen in the shift reactor 110. The hydrogen produced in the shift reactor 110 may be used in the naphtha hydrotreating unit 50". The residual water exiting the shift reactor 110 in line 114 may be condensed in a condenser and separated in a cold separator boot. The shift reactor 110 may be a High Temperature shift reactor (HT) or a Medium Temperature shift reactor (MT). Alternatively, the shift reactor may include a combination of High Temperature and Medium Temperature shifts. The combination of High Temperature and Medium Temperature shifts enables maximum conversion of the CO to hydrogen. Operating conditions for the shift reactor will include an operating temperature in the range of from about 200° C. to about 400° C., an operating pressure from about 2000 kPa to about 3000 kPa (absolute). The preferred operating temperature will be within the range of from about 280° C. to about 300° C., and the preferred operating pressure is about 2400 kPa to about 2900 kPa. The shift reactor 110 includes catalyst that may be selected from a variety of potential catalysts like iron oxide based catalysts, KATALCO K8-11, SSK-10 etc.

The syn gas from the syn gas treating unit 94 may be bypassed directly to the shift reactor 110 when there is no regeneration in the adsorbent column. The syn gas from the coke gasification unit 90 in line 96 comprises about 60 mole % of carbon monoxide. The carbon mono-oxide in the syn gas is converted to hydrogen in the shift reactor that may be used as make-up gas in the naphtha hydrotreating unit for hydrotreating reactions.

The removal of oxygenates from naphtha by combination of a water wash and adsorption in adsorbent column provides an effective removal of oxygenates of about 90% and preferably about 99% of the oxygenates from the crude naphtha. In addition, by combining the adsorbent column with the shift reactor enables the conversion of CO in the regenerant syn gas to hydrogen. The additional hydrogen produced by shift reaction may be beneficially used for hydrotreating in the naphtha hydrotreating unit. The naphtha hydrotreating unit is used in an effective way to dispose-off the contaminants oxygenates and sulfur compounds that the circulating naphtha stream picks while regenerating the adsorbent beds. The crude naphtha used for further cracking and other commercial uses is free of oxygenates and sulfur compounds and as a result avoids consequent undesirable downstream reactions like fouling or deactivation of catalysts.

While the subject matter has been described with what are presently considered the preferred embodiments, it is to be understood that the subject matter is not limited to the disclosed embodiments, but it is intended to cover various modifications and equivalent arrangements included within the scope of the appended claims.

SPECIFIC EMBODIMENTS

While the following is described in conjunction with specific embodiments, it will be understood that this description is intended to illustrate and not limit the scope of the preceding description and the appended claims.

A first embodiment of the invention is a process for removing contaminants from hydrocarbon streams comprising splitting a hydrocarbon feed stream into a light hydrocarbon stream and a splitter bottoms hydrocarbon stream; and contacting the splitter bottoms hydrocarbon stream with a adsorbent at first operating conditions to remove a portion of at least one contaminant to produce an effluent stream. An embodiment of the invention is one, any or all of prior embodiments in this paragraph up through the first embodiment in this paragraph wherein the hydrocarbon feed stream comprises crude naphtha. An embodiment of the invention is one, any or all of prior embodiments in this paragraph up through the first embodiment in this paragraph wherein the contaminants are oxygenates. An embodiment of the invention is one, any or all of prior embodiments in this paragraph up through the first embodiment in this paragraph the process further comprising contacting the hydrocarbon feed stream with a water wash section to remove a portion of at least one contaminant to produce a partially treated hydrocarbon stream. An embodiment of the invention is one, any or all of prior embodiments in this paragraph up through the first embodiment in this paragraph wherein adsorbent comprises alkaline promoted alumina, molecular sieves selected from the group consisting of faujasites (13X, CaX, NaY, CaY, and ZnX), chabazites, clinoptilolites and LTA (4A, 5A) zeolites. An embodiment of the invention is one, any or all of prior embodiments in this paragraph up through the first embodiment in this paragraph wherein the adsorption conditions include a temperature of about 10° C. to about 100° C. and a pressure of about 1 $kg/cm^2$ g to about 10 $kg/cm^2$ g. An embodiment of the invention is one, any or all of prior embodiments in this paragraph up through the first embodiment in this paragraph further comprising taking a slip stream from a naphtha stripper bottoms hydrocarbon stream to regenerate the adsorbent.

A second embodiment of the invention is a process for removing contaminants from hydrocarbon streams comprising splitting a hydrocarbon feed stream into a light hydrocarbon stream and a splitter bottoms hydrocarbon stream; contacting the splitter bottoms hydrocarbon stream with a adsorbent at first operating conditions to remove a portion of at least one contaminant to produce an effluent stream; contacting a light hydrocarbon stream from overhead of a naphtha splitter with the adsorbent to regenerate the adsorbent; and wherein the hydrocarbon feedstream comprises crude naphtha. An embodiment of the invention is one, any or all of prior embodiments in this paragraph up through the second embodiment in this paragraph wherein the contaminants are oxygenates. An embodiment of the invention is one, any or all of prior embodiments in this paragraph up through the second embodiment in this paragraph the process further comprising contacting the hydrocarbon feed stream with a water wash section to remove a portion of at least one contaminant to produce a partially treated hydrocarbon stream. An embodiment of the invention is one, any or all of prior embodiments in this paragraph up through the second embodiment in this paragraph wherein the adsorbent comprises alkaline or alkali earth promoted alumina, molecular sieves selected from the group consisting of faujasites (13X, CaX, NaY, CaY, and ZnX), chabazites, clinoptilolites and LTA (4A, 5A) zeolites. An embodiment of the invention is one, any or all of prior embodiments in this paragraph up through the second embodiment in this paragraph wherein the adsorption conditions include a temperature of about 10° C. to about 100° C. and a pressure of about 1 kg/cm² g to about 15 kg/cm² g.

A third embodiment of the invention is a process for removing contaminants from hydrocarbon streams comprising splitting a hydrocarbon feed stream into a light hydrocarbon stream and a splitter bottoms hydrocarbon stream; contacting the splitter bottoms hydrocarbon stream with a adsorbent at first operating conditions to remove a portion of at least one contaminant to produce an effluent stream; and contacting a syn gas stream with the adsorbent to regenerate the adsorbent. An embodiment of the invention is one, any or all of prior embodiments in this paragraph up through the third embodiment in this paragraph wherein the hydrocarbon feedstream comprises crude naphtha. An embodiment of the invention is one, any or all of prior embodiments in this paragraph up through the third embodiment in this paragraph wherein the contaminants are oxygenates. An embodiment of the invention is one, any or all of prior embodiments in this paragraph up through the third embodiment in this paragraph the process further comprising contacting the hydrocarbon feed stream with a water wash section to remove a portion of at least one contaminant to produce a partially treated hydrocarbon stream. An embodiment of the invention is one, any or all of prior embodiments in this paragraph up through the third embodiment in this paragraph wherein the adsorbent comprises alkaline promoted alumina, molecular sieve selected from the group consisting of faujasites (13X, CaX, NaY, CaY, and ZnX), chabazites, clinoptilolites and LTA (4A, 5A) zeolites. An embodiment of the invention is one, any or all of prior embodiments in this paragraph up through the third embodiment in this paragraph wherein the adsorption conditions include a temperature of about 10° C. to about 100° C. and a pressure of about 1 kg/cm² g to about 15 kg/cm² g. An embodiment of the invention is one, any or all of prior embodiments in this paragraph up through the third embodiment in this paragraph further comprising passing the sun gas to a shift reactor to convert carbon monoxide to hydrogen. An embodiment of the invention is one, any or all of prior embodiments in this paragraph up through the third embodiment in this paragraph wherein about 90% to 99% contaminants are removed from the hydrocarbon.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

The invention claimed is:

1. A process for removing contaminants from hydrocarbon streams comprising:
   splitting a hydrocarbon feed stream into a light hydrocarbon stream and a splitter bottoms hydrocarbon stream;
   contacting the splitter bottoms hydrocarbon stream with an adsorbent at first operating conditions to remove a portion of at least one contaminant to produce an effluent stream; and
   taking a slip stream from a naphtha stripper bottoms hydrocarbon stream to regenerate the adsorbent.

2. The process of claim 1, wherein the hydrocarbon feed stream comprises crude naphtha.

3. The process of claim 1, wherein the contaminants are oxygenates.

4. The process of claim 1, further comprising contacting the hydrocarbon feed stream with a water wash section to remove a portion of at least one contaminant to produce a partially treated hydrocarbon stream.

5. The process of claim 1, wherein the adsorbent comprises alkaline promoted alumina, molecular sieves selected from the group consisting of faujasites (13X, CaX, NaY, CaY, and ZnX), chabazites, clinoptilolites and LTA (4A, 5A) zeolites.

6. The process of claim 1, wherein the adsorption conditions include a temperature of about 10° C. to about 100° C. and a pressure of about 1 kg/cm² g to about 10 kg/cm² g.

7. A process for removing contaminants from hydrocarbon streams comprising:
   splitting a hydrocarbon feed stream into a light hydrocarbon stream and a splitter bottoms hydrocarbon stream;
   contacting the splitter bottoms hydrocarbon stream with an adsorbent at first operating conditions to remove a portion of at least one contaminant to produce an effluent stream;
   contacting a light hydrocarbon stream from overhead of a naphtha splitter with the adsorbent to regenerate the adsorbent; and
   wherein the hydrocarbon feed stream comprises crude naphtha.

8. The process of claim 7, wherein the contaminants are oxygenates.

9. The process of claim 7, further comprising contacting the hydrocarbon feed stream with a water wash section to remove a portion of at least one contaminant to produce a partially treated hydrocarbon stream.

10. The process of claim 7, wherein the adsorbent comprises alkaline or alkali earth promoted alumina, molecular sieves selected from the group consisting of faujasites (13X, CaX, NaY, CaY, and ZnX), chabazites, clinoptilolites and LTA (4A, 5A) zeolites.

11. The process of claim 7, wherein the adsorption conditions include a temperature of about 10° C. to about 100° C. and a pressure of about 1 kg/cm² g to about 15 kg/cm² g.

12. A process for removing contaminants from hydrocarbon streams comprising:
  splitting a hydrocarbon feed stream into a light hydrocarbon stream and a splitter bottoms hydrocarbon stream;
  contacting the splitter bottoms hydrocarbon stream with an adsorbent at first operating conditions to remove a portion of at least one contaminant to produce an effluent stream;
  contacting a syn gas stream with the adsorbent to regenerate the adsorbent; and
  passing the syn gas to a shift reactor to convert carbon monoxide to hydrogen.

13. The process of claim 12, wherein the hydrocarbon feed stream comprises crude naphtha.

14. The process of claim 12, wherein the contaminants are oxygenates.

15. The process of claim 12, further comprising contacting the hydrocarbon feed stream with a water wash section to remove a portion of at least one contaminant to produce a partially treated hydrocarbon stream.

16. The process of claim 12, wherein the adsorbent comprises alkaline promoted alumina, molecular sieve selected from the group consisting of faujasites (13X, CaX, NaY, CaY, and ZnX), chabazites, clinoptilolites and LTA (4A, 5A) zeolites.

17. The process of claim 12, wherein the adsorption conditions include a temperature of about 10° C. to about 100° C. and a pressure of about 1 kg/cm$^2$ g to about 15 kg/cm$^2$ g.

18. The process of claim 14 wherein about 50% to about 99% contaminants are removed from the hydrocarbon.

* * * * *